(12) United States Patent
Liu

(10) Patent No.: US 11,452,045 B2
(45) Date of Patent: Sep. 20, 2022

(54) METHOD AND APPARATUS FOR INDICATING TRANSMITTING POWER DIFFERENCE, AND METHOD AND APPARATUS FOR COMPENSATING POWER

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 107 days.

(21) Appl. No.: 17/008,499

(22) Filed: Aug. 31, 2020

(65) Prior Publication Data

US 2020/0396692 A1 Dec. 17, 2020

Related U.S. Application Data

(63) Continuation of application No. PCT/CN2018/077940, filed on Mar. 2, 2018.

(51) Int. Cl.
*H04W 72/04* (2009.01)
*H04W 52/14* (2009.01)
(Continued)

(52) U.S. Cl.
CPC .......... *H04W 52/143* (2013.01); *H04B 1/123* (2013.01); *H04W 52/242* (2013.01); *H04W 52/325* (2013.01); *H04W 52/36* (2013.01)

(58) Field of Classification Search
CPC .. H04B 1/123; H04W 52/143; H04W 52/242; H04W 52/325; H04W 52/36; H04W 52/322; H04W 52/42; H04W 52/54
See application file for complete search history.

(56) References Cited

U.S. PATENT DOCUMENTS 9,532,244 B2 12/2016 Wu et al.
9,917,616 B2 3/2018 Baldemair et al.
(Continued)

FOREIGN PATENT DOCUMENTS

CN 102754385 A 10/2012
CN 103428120 A 12/2013
(Continued)

OTHER PUBLICATIONS

State Intellectual Property Office of the People's Republic of China, Office Action and Search Report Issued in Application No. 201880000263.9, Sep. 18, 2021, 13 pages. (Submitted with Machine Translation).
(Continued)

*Primary Examiner* — Phuc H Tran
(74) *Attorney, Agent, or Firm* — Arch & Lake LLP

(57) ABSTRACT

The present disclosure relates to a method and an apparatus for indicating a transmitting power difference, a method and an apparatus for compensating power, a base station, a user equipment, and a computer-readable storage medium. The method of indicating a transmitting power difference includes: in response to that a transmitting power difference between a synchronization signal block (SSB) and a physical downlink control channel (PDCCH) of remaining minimum system information (RMSI) corresponding to the SSB is greater than a preset threshold, setting, by a base station, primary synchronization signal (PSS) transmitting powers of a preset number of successive SSBs in a preset fixed pattern, where the fixed pattern indicates that the transmitting power difference is greater than the preset threshold; and transmitting the SSB to a user equipment (UE) in a beam scanning manner.

8 Claims, 8 Drawing Sheets

(51) Int. Cl.
   *H04B 1/12*   (2006.01)
   *H04W 52/24*  (2009.01)
   *H04W 52/32*  (2009.01)
   *H04W 52/36*  (2009.01)

(56) References Cited

U.S. PATENT DOCUMENTS

| | | | |
|---|---|---|---|
| 2013/0122946 | A1 | 5/2013 | Zhu et al. |
| 2016/0105853 | A1 | 4/2016 | Zhao et al. |
| 2017/0251460 | A1 | 8/2017 | Agiwal et al. |
| 2020/0245288 | A1* | 7/2020 | Liu ................. H04W 68/025 |
| 2020/0404617 | A1* | 12/2020 | Murray ............ H04W 52/0229 |

FOREIGN PATENT DOCUMENTS

| | | |
|---|---|---|
| CN | 104168636 A | 11/2014 |
| CN | 105075354 A | 11/2015 |

OTHER PUBLICATIONS

ISA State Intellectual Property Office of the People's Republic of China, Written Opinion of the International Searching Authority Issued in Application No. PCT/CN2018/0//940, dated Dec. 4, 2018, WIPO, 9 pages.
ZTE, Sanechips, "Remaining details of RACH procedure", 3GPP TSG RAN WG1 Meeting NR#3, R1-1715382, Nagoya, Japan, Sep. 18-21, 2017, 19 pages.
Nokia, Nokia Shanghai Bell, "Remaining details related on SS/PBCH block", 3GPP TSG-RAN WG1 meeting #92, R1-1802890, Athens, Greece, Feb. 26-Mar. 2, 2018, 2 pages.
Ericsson, "Remaining details on Synchronization signal", 3GPP TSG RAN WG1 Meeting #92, R1-1802940, Athens, Greece, Feb. 26-Mar. 2, 2018, 4 pages.
Qualcomm Incorporated, "Remaining details on synchronization signal design", 3GPP TSG RAN WG1 Meeting #92, R1-1803241, Athens, Greece, Feb. 26-Mar. 2, 2018, 12 pages.
International Search Report to PCT Application No. PCT/CN2018/077940 dated Dec. 4, 2018 with English translation (4p).

* cited by examiner

METHOD AND APPARATUS FOR INDICATING TRANSMITTING POWER DIFFERENCE, AND METHOD AND APPARATUS FOR COMPENSATING POWER

CROSS-REFERENCE TO RELATED APPLICATION

This application is a continuation of International Application No. PCT/CN2018/077940, filed on Mar. 2, 2018, the disclosure of which is incorporated herein by reference in its entirety for all purposes.

TECHNICAL FIELD

The present disclosure relates to the field of communication technologies, and in particular, to a method and an apparatus for indicating a transmitting power difference, a method and an apparatus for compensating a power, a base station, user equipment, and a computer-readable storage medium.

BACKGROUND

With rapid development of wireless communication technologies, the fifth-generation mobile communication technology (5th Generation, referred to as 5G) has emerged. In a recent discussion of 3rd Generation Partnership Project (referred to as 3GPP), there is no provision on a power difference between a synchronization signal block (SSB) and a physical downlink control channel (PDCCH) of remaining minimum system information (RMSI) which follows the SSB, except that the power difference is limited to a maximum of 6 dB. In a parsing process, since acquiring PDCCH from the parsing is a premise of acquiring RMSI from the parsing, the power difference cannot be indicated in the RMSI. While information indicating the power difference cannot be added in a physical broadcast channel (PBCH) either since the content of the PBCH has been fully pre-determined. When the power difference is below 3 dB, the impact on acquiring PDCCH from parsing by user equipment (UE) may be trivial. However, if the power difference is relatively greater, for example, up to 6 dB, an error rate of decoding PDCCH will be significantly increased.

SUMMARY

In view of this, the present disclosure discloses a method and an apparatus for indicating a transmitting power difference, a method and an apparatus for compensating a power, a base station, a user equipment, and a computer-readable storage medium, so as to significantly reduce the error rate of decoding PDCCH.

According to a first aspect of the present disclosure, a method of indicating a transmitting power difference is provided. The method includes: in response to that a transmitting power difference between an SSB and a PDCCH of RMSI corresponding to the SSB is greater than a preset threshold, setting, by a base station, primary synchronization signal (PSS) transmitting powers of a preset number of successive SSBs in a preset fixed pattern, where the fixed pattern indicates that the transmitting power difference is greater than the preset threshold; and transmitting, by the base station, the SSB to a UE in a beam scanning manner.

According to a second aspect of the present disclosure, a method of compensating a power is provided. The method includes: receiving, by a user equipment (UE), an SSB transmitted by a base station; parsing, by the UE, a preset number of successive SSBs which are successively received so as to obtain PSS transmitting powers of the preset number of successive SSBs; deciding whether the PSS transmitting powers of the preset number of successive SSBs conform to a preset fixed pattern; in response to that the PSS transmitting powers of the preset number of successive SSBs conform to the fixed pattern, determining that a transmitting power difference between the SSB and a PDCCH of RMSI corresponding to the SSB is greater than a preset threshold; and compensating a transmitting power of the PDCCH in response to receiving the PDCCH.

According to a third aspect of the present disclosure, a base station is provided. The base station includes: a processor and a memory for storing processor executable instructions. The processor is configured to: in response to that a transmitting power difference between an SSB and a PDCCH of RMSI corresponding to the SSB is greater than a preset threshold, set PSS transmitting powers of a preset number of successive SSBs in a preset fixed pattern, wherein the fixed pattern indicates that the transmitting power difference is greater than the preset threshold; and transmit the SSB to a UE in a beam scanning manner.

According to a fourth aspect of the present disclosure, a UE is provided. The UE includes a processor and a memory for storing processor executable instructions. The processor is configured to: receive an SSB transmitted by a base station; parse a preset number of successive SSBs which are successively received so as to obtain PSS transmitting powers of the preset number of successive SSBs; decide whether the PSS transmitting powers of the preset number of successive SSBs conform to a preset fixed pattern; in response to that the PSS transmitting powers of the preset number of successive SSBs conform to the fixed pattern, determine that a transmitting power difference between the SSB and a PDCCH of RMSI corresponding to the SSB is greater than a preset threshold; and compensate a transmitting power of the PDCCH in response to receiving the PDCCH.

According to a fifth aspect of the present disclosure, provided is a non-transitory computer readable storage medium storing a plurality of programs for execution by a base station having one or more processors, wherein the plurality of programs, when executed by the one or more processors, cause the base station to perform acts comprising: in response to that a transmitting power difference between an SSB and a PDCCH of RMSI corresponding to the SSB is greater than a preset threshold, setting PSS transmitting powers of a preset number of successive SSBs in a preset fixed pattern, wherein the fixed pattern indicates that the transmitting power difference is greater than the preset threshold; and transmitting the SSB to a UE in a beam scanning manner.

According to a sixth aspect of the present disclosure, provided is a non-transitory computer readable storage medium storing a plurality of programs for execution by a UE having one or more processors, wherein the plurality of programs, when executed by the one or more processors, cause the UE to perform acts comprising: receiving an SSB transmitted by a base station; parsing a preset number of successive SSBs which are successively received so as to obtain PSS transmitting powers of the preset number of successive SSBs; deciding whether the PSS transmitting powers of the preset number of successive SSBs conform to a preset fixed pattern; in response to that the PSS transmitting powers of the preset number of successive SSBs conform to the fixed pattern, determining that a transmitting power difference between the SSB and a PDCCH of RMSI corresponding to the SSB is greater than a preset threshold; and compensating a transmitting power of the PDCCH in response to receiving the PDCCH.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION OF THE EMBODIMENTS

Figure 1:
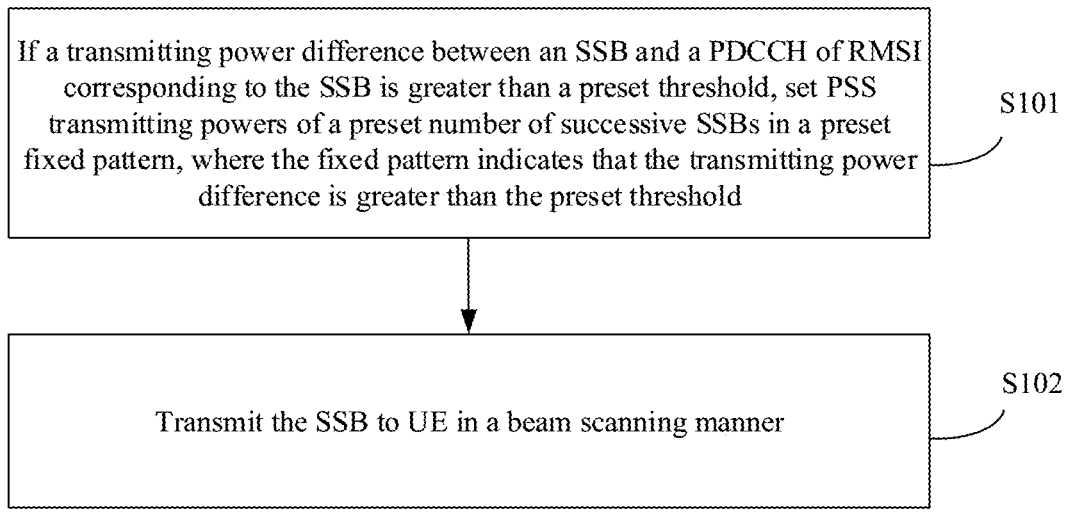
FIG. 1 is a flowchart illustrating a method of indicating a transmitting power difference according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

FIG. 1 is a flowchart illustrating a method of indicating a transmitting power difference according to an exemplary embodiment of the present disclosure. This embodiment is described from a base station side. As shown in FIG. 1, the method of indicating a transmitting power difference includes steps S101-S102.

At step S101, if a transmitting power difference between an SSB and a PDCCH of RMSI corresponding to the SSB is greater than a preset threshold, primary synchronization signal (PSS) transmitting powers of a preset number of successive SSBs are set in a preset fixed pattern, where the fixed pattern indicates that the transmitting power difference is greater than the preset threshold. The term "a preset number of successive SSBs" refers to that the SSB is transmitted or to be transmitted successively the preset number of times based on a beam scanning manner. In one or more embodiments, the preset number of successive SSBs are the same SSB to be transmitted repeatedly by a base station to a UE.

The preset threshold may be set as desired, for example, may be 3 dB. The preset number may be flexibly set as desired, for example, may be 3, 4, and so on.

Figure 2:
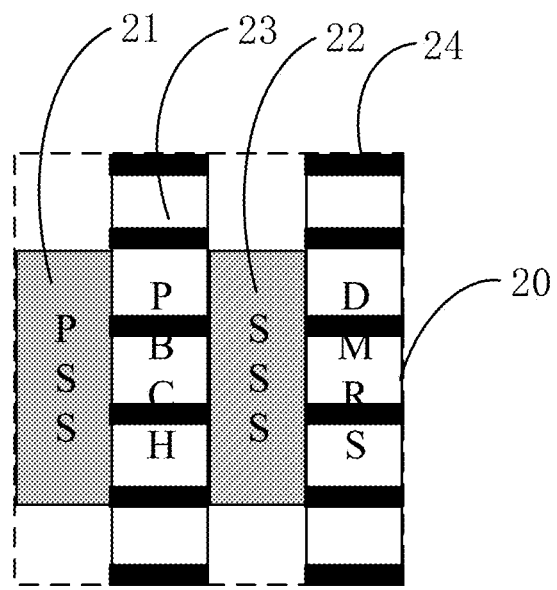
FIG. 2 is a schematic diagram illustrating a structure of an SSB according to an exemplary embodiment of the present disclosure.

As shown in FIG. 2, SSB 20 includes PSS 21, secondary synchronization signal (SSS) 22, PBCH 23, and demodulation reference signal (DMRS) 24 used to demodulate the PBCH. Among them, the transmitting powers of SSS 22, PBCH 23 and DMRS 24 are identical, but no restriction is imposed on the transmitting power of PSS 21. Therefore, in this embodiment, by setting the PSS transmitting powers of the preset number of successive SSBs in the preset fixed pattern, it can be implicitly indicated that the transmitting power difference is greater than the preset threshold.

For example, the PSS transmitting powers of 4 successive SSBs may be set in a high-low-high-low pattern or a low-high-low-high pattern.

At step S102, the SSB is transmitted to a UE in the beam scanning manner.

In this embodiment, the base station transmits the SSB to the UE in the beam scanning manner. In this way, in response to receiving the SSB, the UE can parse the preset number of successive SSBs which are successively received so as to decide whether the PSS transmitting powers of the preset number of successive SSBs conform to the preset fixed pattern, and then determine whether the transmitting power difference is greater than the preset threshold, so as to compensate a transmitting power of the PDCCH when the transmitting power difference is greater than the preset threshold.

In the above embodiment, by setting the PSS transmitting powers of the preset number of successive SSBs in the preset fixed pattern, it is indicated that the transmitting power difference between the SSB and the PDCCH of the RMSI corresponding to the SSB is greater than the preset threshold. The SSB is transmitted to the UE, so that in response to receiving the SSB, the UE can decide, by parsing the preset number of successive SSBs, whether their PSS transmitting powers conform to the preset fixed pattern, and when the PSS transmitting powers conform to the preset fixed pattern, the UE can determine that the transmitting power difference is greater than the preset threshold and compensate the transmitting power of the PDCCH, thereby the error rate of decoding PDCCH can be significantly reduced.

Figure 3:
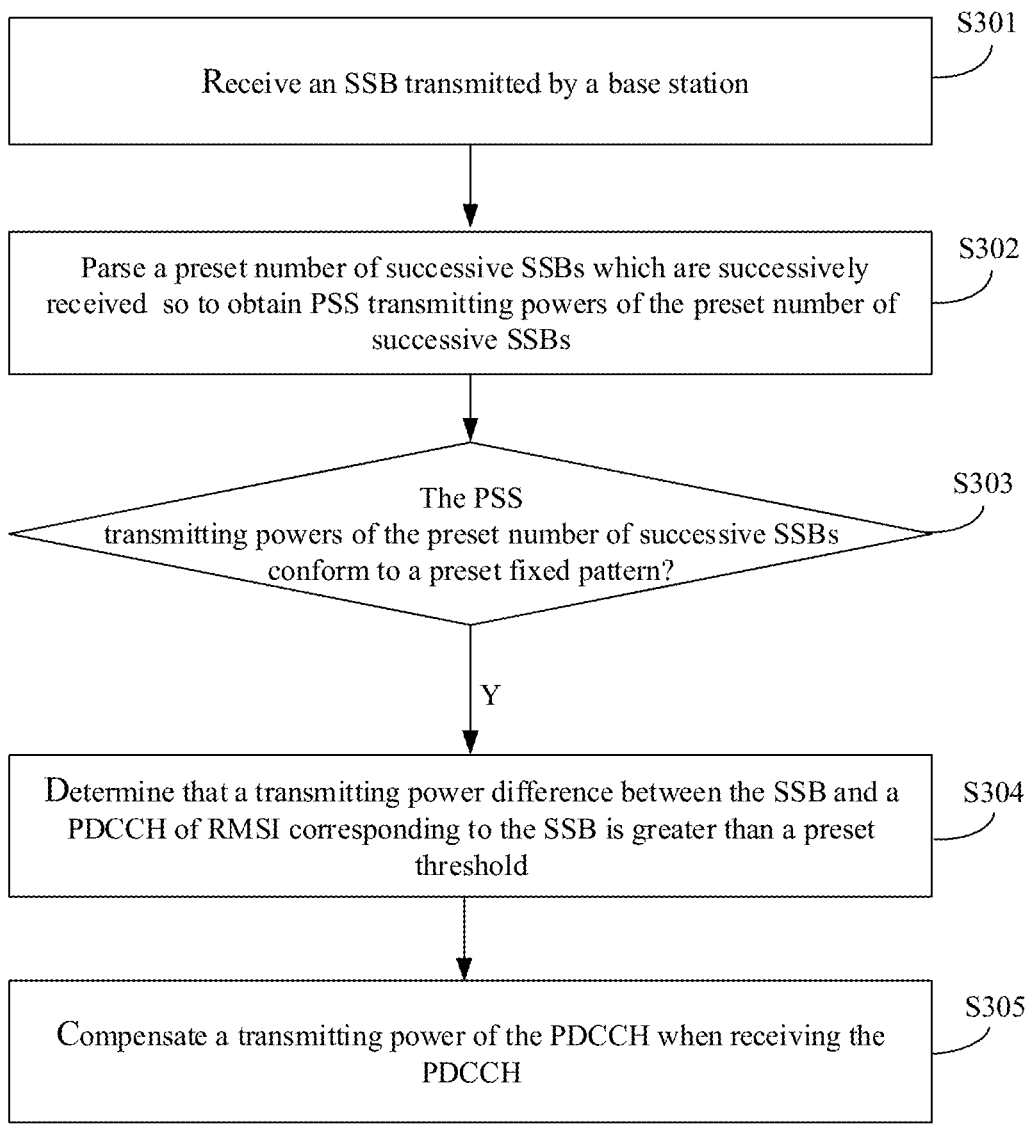
FIG. 3 is a flowchart illustrating a method of compensating a power according to an exemplary embodiment of the present disclosure.

FIG. 3 is a flowchart illustrating a method of compensating a power according to an exemplary embodiment of the present disclosure. This embodiment is described from a UE side. As shown in FIG. 3, the method of compensating power includes steps S301-S305.

At step S301, an SSB transmitted by a base station is received.

At step S302, a preset number of successive SSBs which are successively received are parsed so as to obtain PSS transmitting powers of the preset number of successive SSBs. The term "a preset number of successive SSBs" refers to that the SSB is transmitted or to be transmitted successively the preset number of times based on a beam scanning manner.

The preset number may be flexibly set as desired, for example, may be 3, 4, and so on.

In this embodiment, the UE may parse 4 successive SSBs which are successively received to obtain the PSS transmitting powers of the 4 successive SSBs.

At step S303, it is decided whether the PSS transmitting powers of the preset number of successive SSBs conform to a preset fixed pattern.

It is decided whether the PSS transmitting powers of the preset number of successive SSBs conform to the preset fixed pattern may include: for the preset number of successive SSBs, it is detected whether each of differences between the PSS transmitting powers of every two adjacent SSBs is greater than a preset value; if each of the differences is greater than or equal to the preset value, it is decided whether the PSS transmitting powers of the preset number of successive SSBs conform to the preset fixed pattern based on a value relationship of the PSS transmitting powers of the preset number of successive SSBs. If any one of the differences is smaller than the preset value, it is not to be decided whether the PSS transmitting powers of the preset number of successive SSBs conform to the preset fixed pattern based on the value relationship of the PSS transmitting powers of the preset number of successive SSBs.

The preset value may be flexibly set as desired, for example, may be 2 dB.

For example, the preset value is 2 dB, the preset fixed pattern is a high-low-high-low pattern, and the PSS transmitting powers of 4 successive SSBs obtained by the UE are 100 dB, 97 dB, 100 dB, and 97 dB, respectively. Since each of the differences between the PSS transmitting powers of every two adjacent SSBs is greater than 2 dB, it can be decided whether the PSS transmitting powers of the preset number of successive SSBs conform to the preset fixed pattern based on the value relationship of the PSS transmitting powers of the 4 successive SSBs.

It should be noted that the UE may also customize a fitting possibility of the base station transmitting the PSS. For example, when the UE detects that the PSS transmitting powers of 4 successive SSBs are 100 dB, 97 dB, 100 dB, 98 dB respectively, that is, the PSS transmitting powers are in a pattern of high, low, high and slightly low, it may be considered that the PSS transmitting powers of the 4 successive SSBs also conform to the fixed pattern.

For another example, the preset value is 2 dB, the preset fixed pattern is high-low-high-low pattern, and the PSS transmitting powers of 4 successive SSBs successively obtained by the UE are 99 dB, 98 dB, 99 dB, and 98 dB, respectively. Since each of the differences between the PSS transmitting powers of every two adjacent SSBs is 1 dB which is smaller than the preset value, deciding whether the PSS transmitting powers of the preset number of successive SSBs conform to the preset fixed pattern cannot be performed based on the value relationship of the PSS transmitting powers of the 4 successive SSBs.

At step S304, if the PSS transmitting powers of the preset number of successive SSBs conform to the fixed pattern, it is determined that a transmitting power difference between the SSB and a PDCCH of RMSI corresponding to the SSB is greater than a preset threshold.

In this embodiment, if the UE decides that the PSS transmitting powers of the preset number of successive SSBs conform to the fixed pattern, it can be determined that the transmitting power difference between the SSB and the PDCCH of the RMSI corresponding to the SSB is greater than the preset threshold.

At step S305, when receiving the PDCCH, a transmitting power of the PDCCH is compensated.

If the transmitting power difference between the SSB and the PDCCH of the RMSI corresponding to the SSB is greater than the preset threshold, the transmitting power of the PDCCH can be compensated when the PDCCH being received, so as to significantly reduce the error rate of decoding PDCCH.

In the above embodiment, by receiving the SSB transmitted by the base station, the preset number of successive SSBs are parsed to decide whether their PSS transmitting powers conform to the preset fixed pattern, and when the PSS transmitting powers conform to the preset fixed pattern, it is determined that the transmitting power difference is greater than the preset threshold, and the transmitting power of the PDCCH is compensated, thereby the error rate of decoding PDCCH can be significantly reduced.

Figure 4:
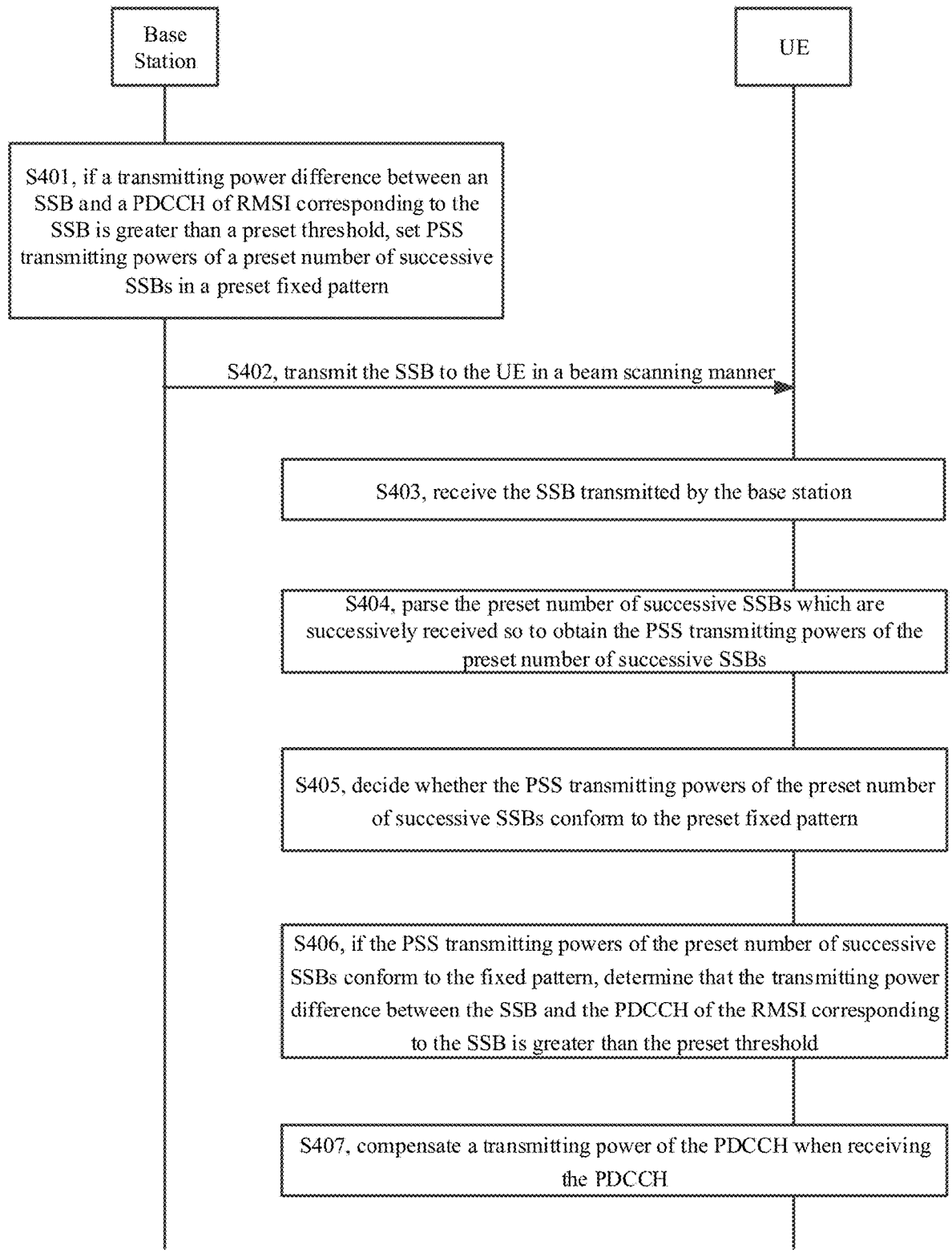
FIG. 4 is a signaling flowchart illustrating a method of compensating a power according to an exemplary embodiment of the present disclosure.

FIG. 4 is a signaling flowchart illustrating a method of compensating a power according to an exemplary embodiment of the present disclosure. This embodiment is described from a perspective of interaction between a UE and a base station. As shown in FIG. 4, the method of compensating power includes steps S401-S407.

At step S401, if a transmitting power difference between an SSB and a PDCCH of RMSI corresponding to the SSB is greater than a preset threshold, the base station sets PSS transmitting powers of a preset number of successive SSBs in a preset fixed pattern, where the fixed pattern indicates that the transmitting power difference is greater than the preset threshold. The term "a preset number of successive SSBs" refers to the SSB to be transmitted successively based on a beam scanning manner.

At step S402, the base station transmits the SSB to the UE in the beam scanning manner.

At step S403, the UE receives the SSB transmitted by the base station.

At step S404, the UE parses the preset number of successive SSBs which are successively received so as to obtain the PSS transmitting powers of the preset number of successive SSBs.

At step S405, the UE decides whether the PSS transmitting powers of the preset number of successive SSBs conform to the preset fixed pattern.

At step S406, if the PSS transmitting powers of the preset number of successive SSBs conform to the fixed pattern, the UE determines that the transmitting power difference between the SSB and the PDCCH of the RMSI corresponding to the SSB is greater than the preset threshold.

At step S407, when receiving the PDCCH, the UE compensates a transmitting power of the PDCCH.

In the above embodiment, through the interaction between the base station and the UE, the UE can decide whether the PSS transmitting powers of the preset number of successive SSBs conform to the preset fixed pattern, and when the PSS transmitting powers conform to the preset fixed pattern, the UE can determine that the transmitting power difference is greater than the preset threshold, and compensate the transmitting power of the PDCCH, thereby the error rate of decoding PDCCH can be significantly reduced.

Figure 5:
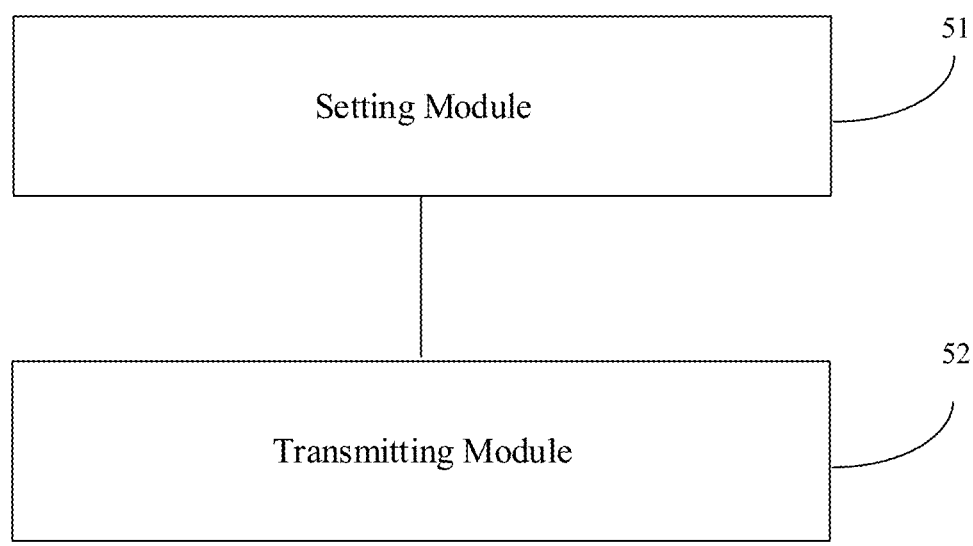
FIG. 5 is a block diagram illustrating an apparatus for indicating a transmitting a power difference according to an exemplary embodiment.

FIG. 5 is a block diagram illustrating an apparatus for indicating a transmitting a power difference according to an exemplary embodiment. The apparatus may be located in a base station. As shown in FIG. 5, the apparatus includes: a setting module 51 and a transmitting module 52.

The setting module 51 is configured to, if a transmitting power difference between an SSB and a PDCCH of RMSI corresponding to the SSB is greater than a preset threshold, set PSS transmitting powers of a preset number of successive SSBs in a preset fixed pattern, where the fixed pattern indicates that the transmitting power difference is greater than the preset threshold. The term "a preset number of successive SSBs" refers to that the SSB is transmitted or to be transmitted successively the preset number of times based on a beam scanning manner.

The preset threshold may be set as desired, for example, may be 3 dB. The preset number may be flexibly set as desired, for example, may be 3, 4, and so on.

As shown in FIG. 2, SSB 20 includes PSS 21, SSS 22, PBCH 23, and DMRS 24 used to demodulate the PBCH. Among them, the transmitting powers of SSS 22, PBCH 23 and DMRS 24 are identical, but no restriction is imposed on the transmitting power of PSS 21. Therefore, in this embodiment, by setting the PSS transmitting powers of a preset number of successive SSBs in the preset fixed pattern, it can be implicitly indicated that the transmitting power difference is greater than the preset threshold.

For example, the PSS transmitting powers of the preset number of successive SSBs may be set in a high-low-high-low pattern or a low-high-low-high pattern.

The transmitting module 52 is configured to transmit to the UE in the beam scanning manner the SSB whose PSS transmitting powers have been set in the fixed pattern by the setting module 51.

In this embodiment, the base station transmits the SSB to a UE in the beam scanning manner. In this way, in response to receiving the SSB, the UE can parse a preset number of successive SSBs which are successively received to decide whether the PSS transmitting powers of the preset number of successive SSBs conform to the preset fixed pattern, and then determine whether the transmitting power difference is greater than the preset threshold, so as to compensate a transmitting power of the PDCCH when the transmitting power difference is greater than the preset threshold.

In the above embodiment, by setting the PSS transmitting powers of a preset number of successive SSBs in the preset fixed pattern, it is indicated that the transmitting power difference between the SSB and the PDCCH of the RMSI corresponding to the SSB is greater than the preset threshold. The SSB is transmitted to the UE, so that in response to receiving the SSB, the UE can decide, by parsing the preset number of successive SSBs, whether the PSS transmitting powers of the preset number of successive SSBs conform to the preset fixed pattern, and when the PSS transmitting powers conform to the preset fixed pattern, the UE can determine that the transmitting power difference is greater than the preset threshold, and compensate the transmitting power of the PDCCH, thereby the error rate of decoding PDCCH can be significantly reduced.

Figure 6:
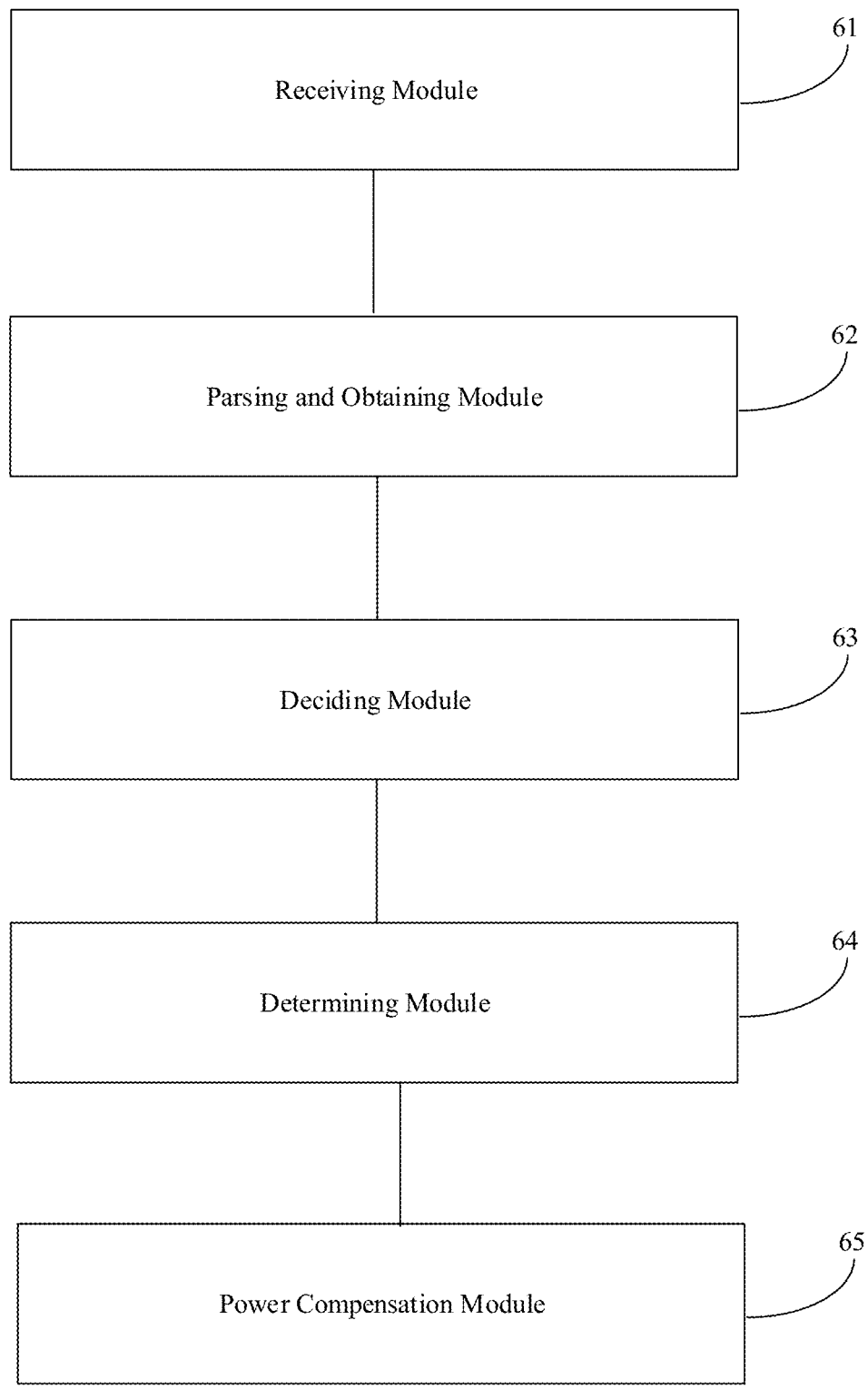
FIG. 6 is a block diagram illustrating an apparatus for compensating a power according to an exemplary embodiment.

FIG. 6 is a block diagram illustrating an apparatus for compensating a power according to an exemplary embodiment. The apparatus can be located in a UE. As shown in FIG. 6, the apparatus includes: a receiving module 61, a parsing and obtaining module 62, a deciding module 63, a determining module 64, and a power compensation module 65.

The receiving module 61 is configured to receive an SSB transmitted by a base station.

The parsing and obtaining module 62 is configured to parse a preset number of successive SSBs which are successively received by the receiving module 61 so as to obtain PSS transmitting powers of the preset number of successive SSBs. The term "a preset number of successive SSBs" refers to the SSB to be transmitted successively based on a beam scanning manner.

The preset number may be flexibly set as desired, for example, may be 3, 4, and so on.

In this embodiment, the UE may parse 4 successive SSBs which are successively received to obtain the PSS transmitting powers of the 4 successive SSBs.

The deciding module 63 is configured to decide whether the PSS transmitting powers of the preset number of successive SSBs which are successively obtained by the parsing and obtaining module 62 conform to a preset fixed pattern.

To decide whether the PSS transmitting powers of the preset number of successive SSBs conform to the preset fixed pattern may include: for the preset number of successive SSBs, it is detected whether each of differences between the PSS transmitting powers of every two adjacent SSBs is greater than a preset value; if each of the differences is greater than or equal to the preset value, deciding whether the PSS transmitting powers of the preset number of successive SSBs conform to the fixed pattern can be performed based on a value relationship of the PSS transmitting powers of the preset number of successive SSBs. If any one of the differences is smaller than the preset value, deciding whether the PSS transmitting powers of the preset number of successive SSBs conform to the fixed pattern cannot be performed based on the value relationship of the PSS transmitting powers of the preset number of successive SSBs.

The preset value may be flexibly set as desired, for example, may be 2 dB.

For example, the preset value is 2 dB, the preset fixed pattern is a high-low-high-low pattern, and the PSS transmitting powers of 4 successive SSBs successively obtained by the UE are 100 dB, 97 dB, 100 dB, and 97 dB, respectively. Since each of the differences between the PSS transmitting powers of every two adjacent SSBs is greater than 2 dB, it can be decided whether the PSS transmitting powers of the preset number of successive SSBs conform to the preset fixed pattern based on the value relationship of the 4 successive SSBs.

It should be noted that the UE may also customize a fitting possibility of the base station transmitting the PSS. For example, when the UE detects that the PSS transmitting powers of 4 successive SSBs are 100 dB, 97 dB, 100 dB, 98 dB respectively, that is, the PSS transmitting powers are in a pattern of high, low, high and slightly low, it may be considered that the PSS transmitting powers of the 4 successive SSBs also conform to the fixed pattern.

For another example, the preset value is 2 dB, the preset fixed pattern is high-low-high-low pattern, and the PSS transmitting powers of a preset number of successive SSBs successively obtained by the UE are 99 dB, 98 dB, 99 dB, and 98 dB, respectively. Since each of the differences between the PSS transmitting powers of every two adjacent SSBs is 1 dB which is smaller than the preset value, deciding whether the PSS transmitting powers of the preset number of successive SSBs conform to the preset fixed pattern cannot be performed based on the value relationship of the PSS transmitting powers of the 4 successive SSBs.

The determining module 64 is configured to, if the deciding module 63 decides that the PSS transmitting powers of the preset number of successive SSBs conform to the fixed pattern, determine that a transmitting power difference between the SSB and a PDCCH of RMSI corresponding to the SSB is greater than a preset threshold.

In this embodiment, if the UE decides that the PSS transmitting powers of the preset number of successive SSBs conform to the fixed pattern, it can be determined that the transmitting power difference between the SSB and the PDCCH of the RMSI corresponding to the SSB is greater than the preset threshold.

The power compensation module 65 is configured to, if the determining module 64 determines that the transmitting power difference is greater than the preset threshold, compensate a transmitting power of the PDCCH when the PDCCH being received.

If the transmitting power difference between the SSB and the PDCCH of the RMSI corresponding to the SSB is greater than the preset threshold, the transmitting power of the PDCCH can be compensated when the PDCCH being received, so as to significantly reduce the error rate of decoding PDCCH.

In the above embodiment, by receiving the SSB transmitted by the base station, the preset number of successive SSBs are parsed to decide whether the PSS transmitting powers of the preset number of successive SSBs conform to the preset fixed pattern, and when the PSS transmitting powers conform to the preset fixed pattern, it is determined that the transmitting power difference is greater than the preset threshold, and the transmitting power of the PDCCH is compensated, thereby the error rate of decoding PDCCH can be significantly reduced.

Figure 7:
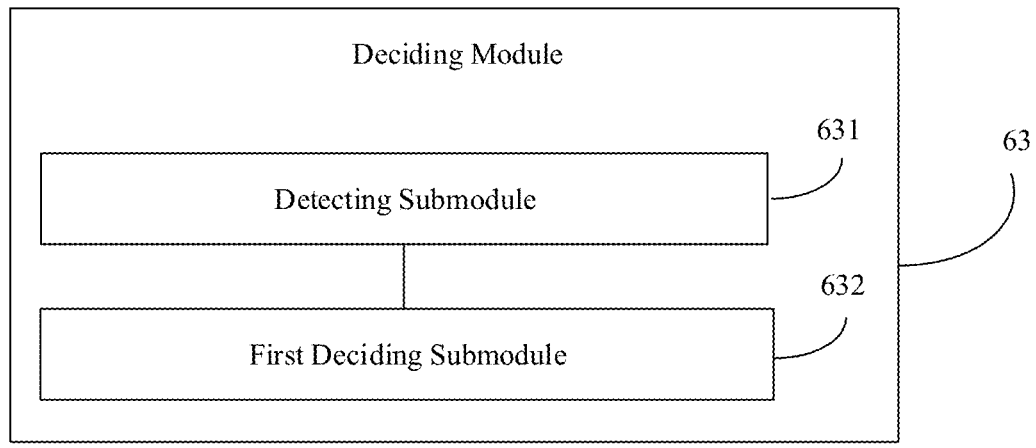
FIG. 7 is a block diagram illustrating another apparatus for compensating a power according to an exemplary embodiment.

FIG. 7 is a block diagram illustrating another apparatus for compensating a power according to an exemplary embodiment. As shown in FIG. 7, on the basis of the embodiment shown in FIG. 6, the deciding module 63 may include: a detecting submodule 631 and a first deciding submodule 632.

The detecting submodule 631 is configured to, for the preset number of successive SSBs, detect whether each of the differences between the PSS transmitting powers of every two adjacent SSBs is greater than the preset value.

The first deciding submodule 632 is configured to, if the detecting submodule 631 detects that each of the differences is greater than or equal to the preset value, decide whether the PSS transmitting powers of the preset number of successive SSBs conform to the fixed pattern based on the value relationship of the PSS transmitting powers of the preset number of successive SSBs.

In the above embodiment, for the preset number of successive SSBs, by detecting whether each of the differences between the PSS transmitting powers of every two adjacent SSBs is greater than the preset value, and when it is detected that each of the differences is greater than or equal to the preset value, deciding whether their PSS transmitting powers conform to the fixed pattern based on the value relationship of their PSS transmitting powers, it can improve the accuracy of deciding the fixed pattern.

Figure 8:
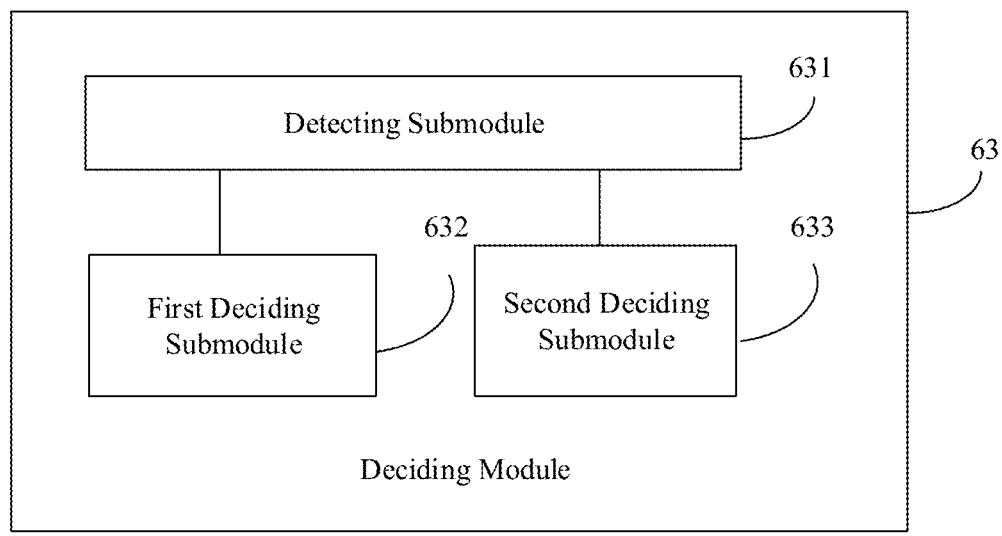
FIG. 8 is a block diagram illustrating another apparatus for compensating a power according to an exemplary embodiment.

FIG. 8 is a block diagram illustrating another apparatus for compensating a power according to an exemplary embodiment. As shown in FIG. 8, on the basis of the embodiment shown in FIG. 7, the deciding module 63 may further include: a second deciding submodule 633.

The second deciding submodule 633 is configured to, if the detecting submodule 631 detects that any difference is smaller than the preset value, be not to decide whether the PSS transmitting powers of the preset number of successive SSBs conform to the fixed pattern based on the value relationship of the PSS transmitting powers of the preset number of successive SSBs.

In the above embodiment, when it is detected that any difference is smaller than the preset value, deciding whether the PSS transmitting powers of the preset number of successive SSBs conform to the fixed pattern cannot be performed based on the value relationship of the PSS transmitting powers of the preset number of successive SSBs. It can improve the accuracy of deciding the fixed pattern.

Figure 9:
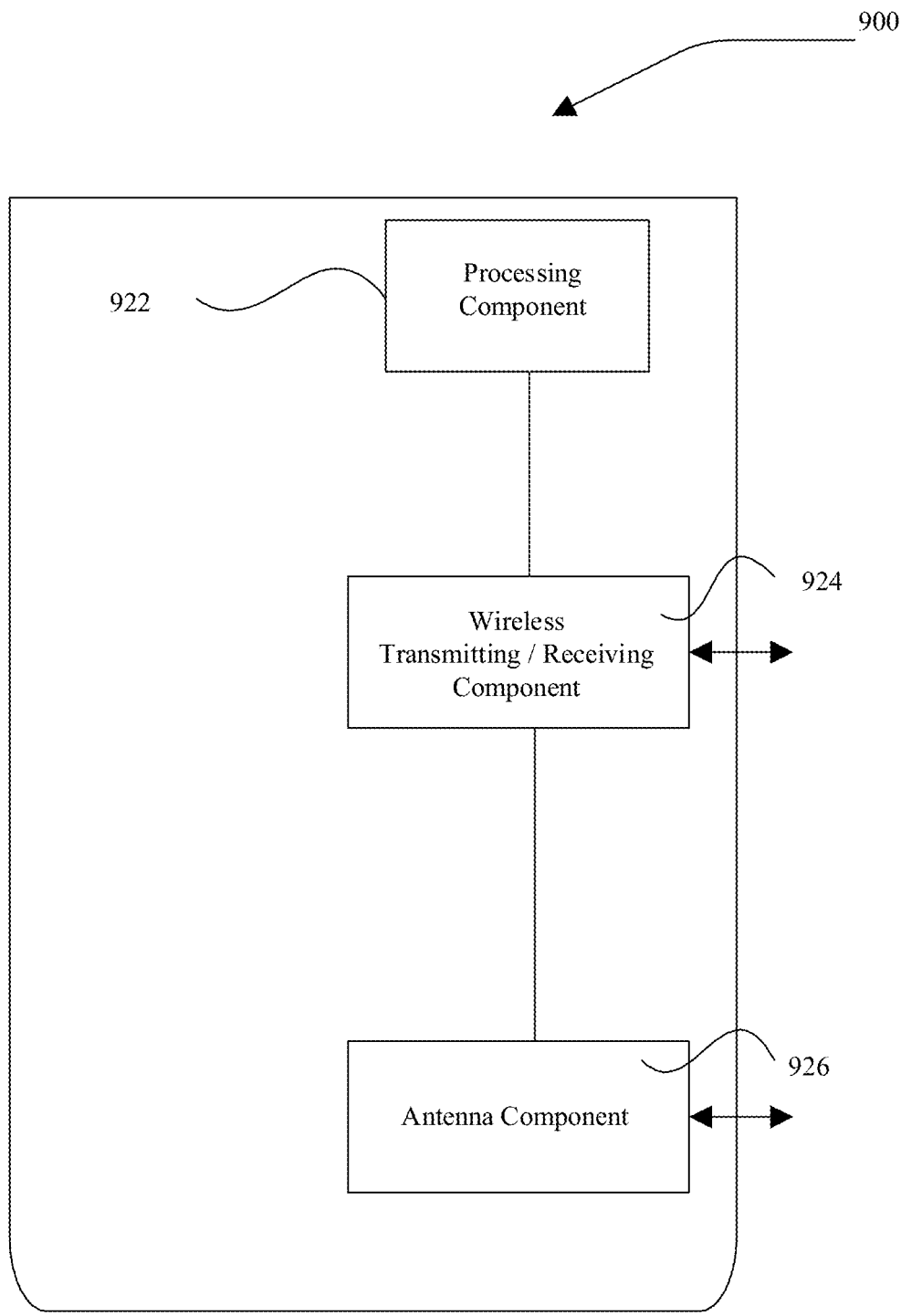
FIG. 9 is a block diagram applicable to an apparatus for indicating a transmitting power difference according to an exemplary embodiment.

FIG. 9 is a block diagram applicable to an apparatus for indicating a transmitting power difference according to an exemplary embodiment. A device 900 may be a base station. Referring to FIG. 9, the device 900 includes a processing component 922, a wireless transmitting/receiving component 924, an antenna component 926, and a signal processing part unique to a wireless interface. The processing component 922 may further include one or more processors.

One of the processors in the processing component 922 may be configured to: if a transmitting power difference between an SSB and a PDCCH of RMSI corresponding to the SSB is greater than a preset threshold, set PSS transmitting powers of a preset number of successive SSBs in a preset fixed pattern, where the fixed pattern indicates that the transmitting power difference is greater than the preset threshold, and transmit the SSB to a UE in a beam scanning manner.

In an exemplary embodiment, a non-transitory computer-readable storage medium including instructions is also provided, where the instructions can be executed by the processing component 922 of the device 900 to complete the above method for indicating a transmitting power difference. For example, the non-transitory computer-readable storage medium may be a ROM, a random access memory (RAM), a CD-ROM, a magnetic tape, a floppy disk, an optical data storage device, and the like.

Figure 10:
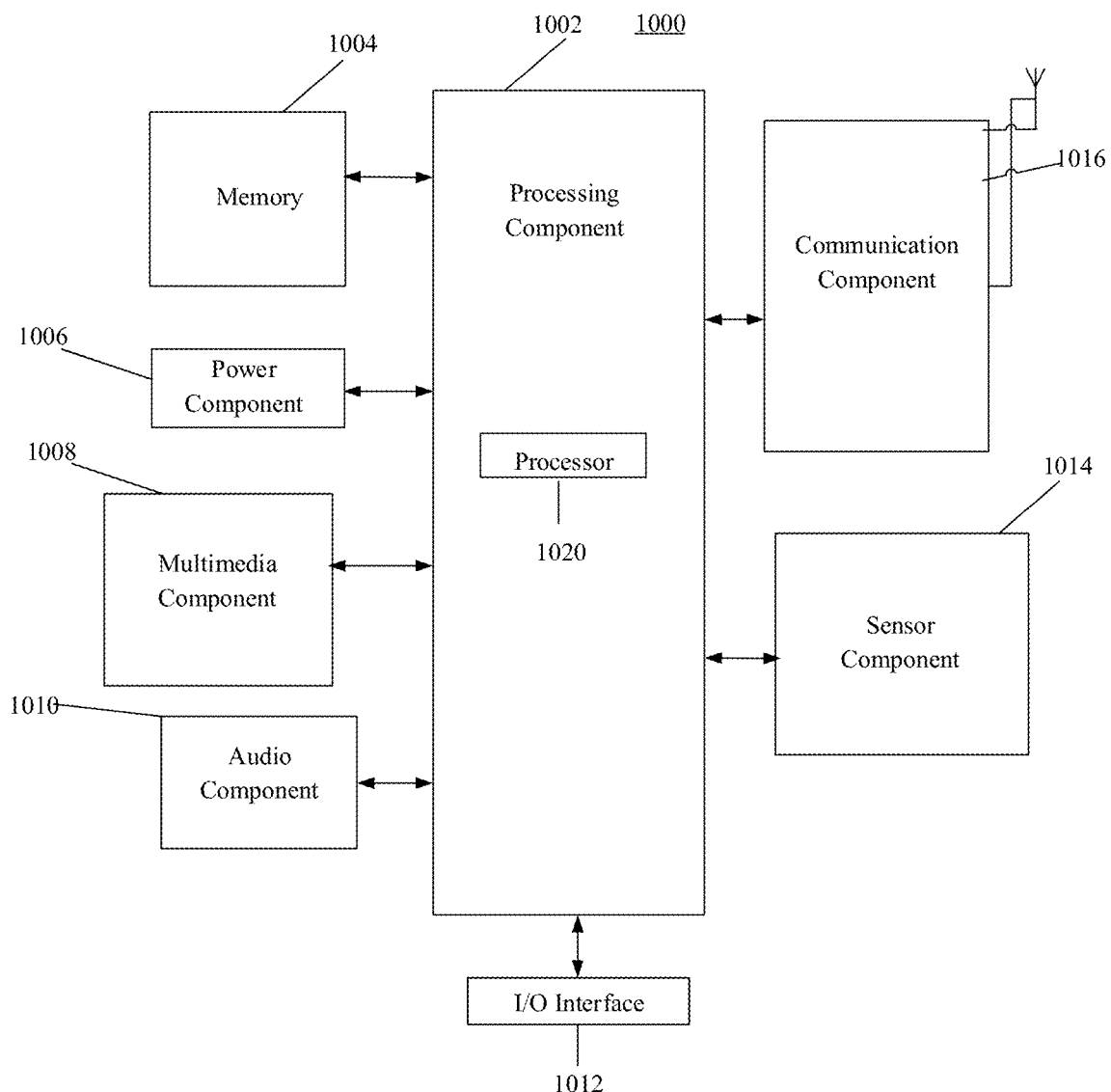
FIG. 10 is a block diagram applicable to an apparatus for compensating a power according to an exemplary embodiment.

FIG. 10 is a block diagram applicable to an apparatus for compensating power according to an exemplary embodiment. For example, a device 1000 may be a mobile phone, a computer, a digital broadcasting terminal, a messaging device, a game console, a tablet device, a medical device, a fitness device, a personal digital assistant, or other user equipment.

As shown in FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls the overall operations of the device 1000, such as operations associated with display, telephone calls, data communications, camera operations, and recording operations. The processing component 1002 may include one or more processors 1020 to execute instructions to complete all or part of the steps of the above method. In addition, the processing component 1002 may include one or more modules to facilitate interaction between the processing component 1002 and other components. For example, the processing component 1002 may include a multimedia module to facilitate interaction between the multimedia component 1008 and the processing component 1002.

One of the processors 1020 in the processing component 1002 may be configured to: receive an SSB transmitted by a base station; parse a preset number of successive SSBs which are successively received so as to obtain PSS transmitting powers of the preset number of successive SSBs; decide whether the PSS transmitting powers of the preset number of successive SSBs conform to a preset fixed pattern; if the PSS transmitting powers of the preset number of successive SSBs conform to the fixed pattern, determine that a transmitting power difference between the SSB and a PDCCH of RMSI corresponding to the SSB is greater than a preset threshold; and compensate a transmitting power of the PDCCH when receiving the PDCCH.

The memory 1004 is configured to store various types of data to support operation at the device 1000. Examples of such data include instructions for any application or method operating on the device 1000, contact data, phone book data, messages, pictures, videos, and on the like. The memory 1004 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power component 1006 provides power to various components of the device 1000. The power component 1006 may include a power management system, one or more power sources, and other components associated with generating, managing, and distributing power for the device 1000.

The multimedia component 1008 includes a screen between the device 1000 and the user that provides an output interface. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure related to the touch or sliding operation. In some embodiments, the multimedia component 1008 includes a front camera and/or a rear camera. When the device 1000 is in an operation mode, such as a shooting mode or a video mode, the front camera and/or the rear camera may receive external multimedia data. Each front and rear camera can be a fixed optical lens system or have focal length and optical zooming capabilities.

The audio component 1010 is configured to output and/or input audio signals. For example, the audio component 1010 includes a microphone (MIC) that is configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, a button, or the like. These buttons may include, but are not limited to, a home button, a volume button, a start button, and a lock button.

The sensor component 1014 includes one or more sensors for providing the device 1000 with status assessment in various aspects. For example, the sensor component 1014 can detect an open/closed state of the device 1000, a relative positioning of components, such as the display and keypad of the device 1000 and the sensor component 1014 can also detect a change in position of the device 1000 or a component of the device 1000, the presence or absence of user contact with the device 1000, orientation or acceleration/deceleration of the device 1000, and temperature change of the device 1000. The sensor component 1014 may include a proximity sensor configured to detect the presence of nearby objects without any physical contact. The sensor assembly 1014 may also include a light sensor, such as a Complementary Metal-Oxide-Semiconductor (CMOS) or Charged Coupled Device (CCD) image sensor, for use in imaging applications. In some embodiments, the sensor component 1014 may further include an acceleration sensor, a gyro sensor, a magnetic sensor, a pressure sensor, or a temperature sensor.

The communication component 1016 is configured to facilitate wired or wireless communication between the device 1000 and other devices. The device 1000 may access a wireless network based on a communication standard, such as Wi-Fi, 2G, 3G, or a combination thereof. In an exemplary embodiment, the communication component 1016 receives broadcast signals or broadcast related information from an external broadcast management system via a broadcast channel. In one exemplary embodiment, the communication component 1016 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1000 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic components for performing the above methods.

In an exemplary embodiment, there is also provided a non-transitory computer-readable storage medium including instructions, such as the memory 1004 including instructions executable by the processor 1020 of the device 1000 to implement the above method. For example, the non-transitory computer-readable storage medium may be a ROM, a random access memory (RAM), a CD-ROM, a magnetic tape, a floppy disk, and an optical data storage device.

Since the apparatus embodiments essentially correspond to the method embodiments, reference may be made to the description of related parts of the method embodiments. The apparatus embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the elements.

Other implementations of the present disclosure will be readily apparent to those skilled in the art after implementing the disclosure by referring to the specification. The present application is intended to cover any variations, uses, or adaptations of the present disclosure which are in accordance with the general principles of the present disclosure and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

The invention claimed is:

1. A method of indicating a transmitting power difference, the method comprising:
   in response to determining that the transmitting power difference between a synchronization signal block (SSB) and a physical downlink control channel (PDCCH) of remaining minimum system information (RMSI) corresponding to the SSB is greater than a preset threshold, setting, by a base station, primary synchronization signal (PSS) transmitting powers of a preset number of successive SSBs in a preset fixed pattern, wherein the preset fixed pattern indicates that the transmitting power difference is greater than the preset threshold, wherein the successive SSBs are transmitted successively based on a beam scanning manner; and
   transmitting, by the base station, the SSB to a user equipment (UE) in the beam scanning manner.

2. A method of compensating a power, the method comprising:
   receiving, by a user equipment (UE), a synchronization signal block (SSB) transmitted by a base station;
   parsing, by the UE, a preset number of successive SSBs which are successively received so as to obtain primary synchronization signal (PSS) transmitting powers of the preset number of successive SSBs, wherein the successive SSBs are transmitted successively based on a beam scanning manner;
   deciding, by the UE, whether the PSS transmitting powers of the preset number of successive SSBs conform to a preset fixed pattern;
   in response to determining that the PSS transmitting powers of the preset number of successive SSBs conform to the preset fixed pattern, determining, by the UE, that a transmitting power difference between the SSB and a physical downlink control channel (PDCCH) of remaining minimum system information (RMSI) corresponding to the SSB is greater than a preset threshold; and
   compensating, by the UE, a transmitting power of the PDCCH in response to receiving the PDCCH.

3. The method according to claim 2, wherein deciding, by the UE, whether the PSS transmitting powers of the preset number of successive SSBs conform to the preset fixed pattern comprises:
   for the preset number of successive SSBs, detecting, by the UE, whether each of differences between the PSS transmitting powers of every two adjacent SSBs is greater than a preset value; and
   in response to determining that each of the differences is greater than or equal to the preset value, deciding, by the UE, whether the PSS transmitting powers of the preset number of successive SSBs conform to the preset fixed pattern based on a value relationship of the PSS transmitting powers of the preset number of successive SSBs.

4. The method according to claim 3, further comprising:
   in response to determining that any one of the differences is smaller than the preset value, disabling, by the UE, determination of whether the PSS transmitting powers of the preset number of successive SSBs conform to the preset fixed pattern based on the value relationship of the PSS transmitting powers of the preset number of successive SSBs.

5. A base station, comprising:
   a processor; and
   a memory for storing processor executable instructions;
   wherein the processor is configured to:
      in response to determining that a transmitting power difference between a synchronization signal block (SSB) and a physical downlink control channel (PDCCH) of remaining minimum system information (RMSI) corresponding to the SSB is greater than a preset threshold, set primary synchronization signal (PSS) transmitting powers of a preset number of successive SSBs in a preset fixed pattern, wherein the preset fixed pattern indicates that the transmitting power difference is greater than the preset threshold, wherein the successive SSBs are transmitted successively based on a beam scanning manner; and
      transmit the SSB to a user equipment (UE) in the beam scanning manner.

6. A user equipment, comprising:
   a processor; and
   a memory for storing processor executable instructions;
   wherein the processor is configured to:
      receive a synchronization signal block (SSB) transmitted by a base station;
      parse a preset number of successive SSBs which are successively received so as to obtain primary synchronization signal (PSS) transmitting powers of the preset number of successive SSBs;
      decide whether the PSS transmitting powers of the preset number of successive SSBs conform to a preset fixed pattern, wherein the successive SSBs are transmitted successively based on a beam scanning manner;
      in response to determining that the PSS transmitting powers of the preset number of successive SSBs conform to the preset fixed pattern, determine that a transmitting power difference between the SSB and a physical downlink control channel (PDCCH) of remaining minimum system information (RMSI) corresponding to the SSB is greater than a preset threshold; and
      compensate a transmitting power of the PDCCH in response to receiving the PDCCH.

7. The user equipment according to claim 6, wherein when deciding whether the PSS transmitting powers of the preset number of successive SSBs conform to the preset fixed pattern, the processor is configured to:
   for the preset number of successive SSBs, detect whether each of differences between the PSS transmitting powers of every two adjacent SSBs is greater than a preset value; and in response to determining that each of the differences is greater than or equal to the preset value, decide whether the PSS transmitting powers of the preset number of successive SSBs conform to the preset fixed pattern based on a value relationship of the PSS transmitting powers of the preset number of successive SSBs.

8. The user equipment according to claim 7, wherein when deciding whether the PSS transmitting powers of the preset number of successive SSBs conform to the preset fixed pattern, the processor is further configured to:

in response to determining that any one of the differences is smaller than the preset value, disable the deciding whether the PSS transmitting powers of the preset number of successive SSBs conform to the preset fixed pattern based on the value relationship of the PSS transmitting powers of the preset number of successive SSBs.

* * * * *